United States Patent
Mathews, Jr. et al.

(10) Patent No.: US 12,203,411 B2
(45) Date of Patent: *Jan. 21, 2025

(54) ENGINE CONTROLLER FOR A GAS TURBINE ENGINE

(71) Applicant: General Electric Company, Schenectady, NY (US)

(72) Inventors: Harry Kirk Mathews, Jr., Clifton Park, NY (US); William Morton, Niskayuna, NY (US); Constantinos Minas, Slingerlands, NY (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,954

(22) Filed: Jun. 29, 2023

(65) Prior Publication Data
US 2023/0340907 A1    Oct. 26, 2023

Related U.S. Application Data (63) Continuation-in-part of application No. 17/702,120, filed on Mar. 23, 2022, now Pat. No. 11,739,662.

(51) Int. Cl.
*F01D 25/24* (2006.01)
*F02C 3/04* (2006.01)
*F02C 7/00* (2006.01)

(52) U.S. Cl.
CPC .............. *F02C 7/00* (2013.01); *F01D 25/24* (2013.01); *F02C 3/04* (2013.01); *F05D 2270/30* (2013.01)

(58) Field of Classification Search
CPC ....... F01D 25/24; B64C 7/02; F05D 2220/32; F05D 2240/14
See application file for complete search history.

(56) References Cited

U.S. PATENT DOCUMENTS 4,716,722 A    1/1988  Rambach
5,031,396 A    7/1991  Margnelli
(Continued)

OTHER PUBLICATIONS

Business Editor, "StandardAero establishes CFM56-7B Service Centre at DFW International Airport", AIRGUIDE, Feb. 8, 2023, Retrieved from Internet: https://www.airguide.info/standardaero-establishes-cfm56-7b-service-centre-at-dfw-international-airport/.
(Continued)

*Primary Examiner* — David E Sosnowski
*Assistant Examiner* — Theodore C Ribadeneyra
(74) *Attorney, Agent, or Firm* — Dority & Manning, P.A.

(57) ABSTRACT

A gas turbine engine is provided having: a turbomachine; a fan section having a fan rotatable by the turbomachine; a nacelle enclosing the fan; and an engine controller positioned within the nacelle. The nacelle defines an inner surface radius (r) along the radial direction inward of the engine controller, wherein the engine controller defines a radial height (Δr) along the radial direction, a total volume (V), and a normalized radius (r'). The normalized radius (r') is a ratio of the inner surface radius (r) to the total volume (V) to cube root, and wherein these parameters are related by the following equation:

$$0.1(r')^{-1} < \Delta r/r < K(r')^{-4/3},$$

wherein the normalized radius (r') is between 1.25 and 8 and K is equal to 40%, or the normalized radius (r') is between 2.75 and 4.5 and K is equal to 65%.

20 Claims, 6 Drawing Sheets

(56) References Cited

U.S. PATENT DOCUMENTS

| | | |
|---|---|---|
| 5,174,110 A | 12/1992 | Duesler et al. |
| 5,435,124 A | 7/1995 | Sadil et al. |
| 6,434,473 B1 | 8/2002 | Hattori |
| 6,771,501 B2 | 8/2004 | Coleman et al. |
| 6,943,699 B2 | 9/2005 | Ziarno |
| 7,010,906 B2 | 3/2006 | Cazenave et al. |
| 7,090,165 B2 | 8/2006 | Jones et al. |
| D672,342 S | 12/2012 | Herreid, II et al. |
| 8,882,450 B2 | 11/2014 | Boucher et al. |
| 9,204,566 B2 | 12/2015 | Balk et al. |
| 9,386,712 B2 | 7/2016 | Veilleux, Jr. |
| 9,699,833 B2 | 7/2017 | Broughton et al. |
| D802,582 S | 11/2017 | Krivonak et al. |
| 10,125,636 B2 | 11/2018 | Dube et al. |
| 10,358,936 B2 | 7/2019 | Hockaday et al. |
| 11,313,241 B2 | 4/2022 | Tejero Embuena et al. |
| 11,480,073 B2 | 10/2022 | Christie et al. |
| 11,739,662 B1 | 8/2023 | Mathews, Jr. et al. |
| 2004/0238687 A1 | 12/2004 | Jones et al. |
| 2005/0045774 A1 | 3/2005 | Hocking |
| 2007/0029454 A1 | 2/2007 | Suttie et al. |
| 2010/0263900 A1 | 10/2010 | DiVincenzo et al. |
| 2012/0095661 A1 | 4/2012 | Roy et al. |
| 2012/0103685 A1 | 5/2012 | Blanchard et al. |
| 2013/0161093 A1* | 6/2013 | Broughton ............... F02C 7/32 174/72 A |
| 2013/0258583 A1* | 10/2013 | Balk ................... H05K 5/0234 361/679.48 |
| 2018/0010524 A1 | 1/2018 | Peace et al. |
| 2020/0025034 A1* | 1/2020 | Kling .................... F01D 25/24 |

OTHER PUBLICATIONS

Anonymous, "General Electric GEnx", Wikipedia, Retrieved on Nov. 14, 2024 [https://en.wikipedia.org/wiki/General Electric GEnx].

* cited by examiner

| VARIABLE | UNITS | 1 | 2 | 3 | 4 | 5 | 6 | 7 | 8 | 9 | 10 | 11 | 12 |
|---|---|---|---|---|---|---|---|---|---|---|---|---|---|
| r | in | 18 | 18 | 83 | 81 | 38 | 73 | 18 | 18 | 83 | 80 | 42 | 73 |
| V | in^3 | 2,319 | 2,816 | 1,118 | 1,025 | 2,131 | 1,555 | 2,439 | 2,871 | 1,100 | 1,010 | 2,931 | 1,536 |
| L | in | 31.7 | 27.5 | 31.8 | 26.5 | 28.1 | 29.0 | 31.8 | 23.1 | 31.7 | 22.3 | 29.6 | 30.6 |
| W | in | 31.5 | 19.6 | 31.1 | 19.3 | 26.4 | 25.4 | 16.1 | 17.1 | 17.8 | 13.0 | 21.9 | 27.3 |
| H | in | 2.3 | 5.2 | 1.1 | 2.0 | 2.9 | 2.1 | 2.4 | 3.6 | 1.0 | 1.7 | 2.3 | 0.9 |
| # OF BOXES | - | 1 | 1 | 1 | 1 | 1 | 1 | 2 | 2 | 2 | 2 | 2 | 2 |
| V^(1/3) | - | 13.2 | 14.1 | 10.4 | 10.1 | 12.9 | 11.6 | 13.5 | 14.2 | 10.3 | 10.0 | 14.3 | 11.5 |
| r' | - | 1.3 | 1.3 |  |  |  | 6.3 | 1.4 | 1.3 |  |  | 2.9 | 6.3 |
| Δr | - | 0.18 | 0.37 | 0.11 | 0.2 | 0.22 | 0.18 | 0.29 | 0.37 | 0.14 | 0.2 | 0.25 | 0.19 |
| TYPE | - | CURVED | CURVED | CURVED | CURVED | CURVED | CURVED | SPLIT | SPLIT | SPLIT | SPLIT | SPLIT | SPLIT |

FIG. 7A

| VARIABLE | UNITS | 1 | 2 | 3 | 4 | 5 | 6 | 7 | 8 | 9 | 10 | 11 | 12 |
|---|---|---|---|---|---|---|---|---|---|---|---|---|---|
| r | in | 29 | 32 | 46 | 48 | 44 | 50 | 29 | 29 | 45 | 63 | 34 | 58 |
| V | in^3 | 1,066 | 1,562 | 1,047 | 1,189 | 2,687 | 1,835 | 1,084 | 1,126 | 1,028 | 2,703 | 1,245 | 2,944 |
| L | in | 31 | 26 | 32 | 26 | 30 | 28 | 32 | 18 | 32 | 31 | 23 | 30 |
| W | in | 30 | 18 | 31 | 18 | 30 | 26 | 16 | 16 | 17 | 18 | 18 | 30 |
| H | in | 1.1 | 3.3 | 1.1 | 2.6 | 3.0 | 2.5 | 2.1 | 3.8 | 1.9 | 4.9 | 3.0 | 3.2 |
| # OF BOXES | - | 1 | 1 | 1 | 1 | 1 | 1 | 1 | 1 | 1 | 1 | 1 | 1 |
| V^(1/3) | - | 10.2 | 11.6 | 10.2 | 10.6 | 13.9 | 12.2 | 10.3 | 10.4 | 10.1 | 13.9 | 10.8 | 14.3 |
| r' | - | 2.8 | 2.8 | 4.5 | 4.5 | 3.2 | 4.1 | 2.8 | 2.8 | 4.5 | 4.5 | 3.2 | 4.1 |
| Δr | - | 0.11 | 0.29 | 0.11 | 0.24 | 0.22 | 0.21 | 0.3 | 0.46 | 0.26 | 0.39 | 0.38 | 0.35 |
| TYPE | - | CURVED | CURVED | CURVED | CURVED | CURVED | CURVED | TRAD. | TRAD. | TRAD. | TRAD. | TRAD. | TRAD. |

ENGINE CONTROLLER FOR A GAS TURBINE ENGINE

CROSS-REFERENCE TO RELATED APPLICATIONS

This application is a continuation-in-part application of U.S. application Ser. No. 17/702,120 filed Mar. 23, 2023, which is a non-provisional application and is hereby incorporated by reference in its entirety.

FIELD

The present disclosure relates to an engine controller for a gas turbine engine, and a gas turbine engine having the same.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. An outer nacelle may be provided around the fan assembly to increase a propulsive efficiency of the turbofan engine. In at least certain configurations, a controller for the engine, such as a Full Authority Digital Engine Control controller, may be positioned within the outer nacelle. Improvements to the turbofan engine to increase a propulsive efficiency of the turbofan engine would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "coupled," "fixed," and the like refer to both direct coupling, fixing, or attaching, as well as indirect coupling, fixing, or attaching through one or more intermediate components or features, unless otherwise specified herein.

An objective when designing turbofan engines is generally to maximize a propulsive efficiency of the turbofan engine. Generally, a turbofan engine includes a relatively large fan to provide a desired amount of thrust without overloading fan blades of the fan (i.e., without increasing a disk loading of the fan blades of the fan beyond a certain threshold), and therefore to maintain a desired overall propulsive efficiency for the turbofan engine. Turbofan engine design practice may further strive to provide a large fan, or rather a high diameter fan, on the turbofan engine to allow the fan to provide as much of a total thrust for the turbofan engine as reasonably possible. A turbofan engine including such a large fan, however, may result in, e.g., problems packaging the turbofan engine on an aircraft, a relatively heavy turbofan engine (as a size of an outer nacelle will necessarily increase with the fan diameter), etc. Efforts may be made to reduce a size of the outer nacelle for a turbofan engine having a relatively large fan by reducing a radial height of the outer nacelle. Notably, however, a turbofan engine may include an engine controller mounted within the outer nacelle. A radial height of the engine controller may dictate a minimum radial height of the nacelle, which in turn may have a significant effect on how heavy the outer nacelle will be, an amount of aerodynamic drag on the turbofan engine, and an amount of clearance between the turbofan engine and the ground once installed on an aircraft.

The inventors of the present disclosure found that in order to reduce the radial height of the outer nacelle, a height of the engine controller must be reduced as well. However, as the height of the engine controller is reduced, a weight of the engine controller is increased. For example, the further the engine controller shape gets from, e.g., a cube-like shape, the more outer casing material that is needed to provide a given internal volume for circuit boards, connectors, etc. Thus, there is a trade-off between a desire to reduce the radial height and avoiding excessive weight gain.

The inventors proceeded in the manner of designing a turbofan engine with given fan characteristics (e.g., fan diameter) and corresponding nacelle weights and heights for various engine controller designs; checking the propulsive efficiency of the designed turbofan engine; checking structural issues associated with a weight of the engine controller and outer nacelle; redesigning the turbofan engine with varying fan characteristics (e.g., fan diameter) and corresponding nacelle weights and heights for various engine controller designs; rechecking the propulsive efficiency of the designed turbofan engine; rechecking structural issues associated with the weight of the engine controller and outer nacelle; etc. during the design of several different types of turbofan engines, including the gas turbine engines described below with reference to FIGS. 1 through 5. During the course of this practice of studying/evaluating various primary fan characteristics and corresponding nacelle weights and heights for various engine controller designs considered feasible for best satisfying mission requirements, it was discovered that a certain relationship exists between a ratio of a radial extent of the engine controller to the fan diameter (Δr/r) and a normalized engine controller radius (a ratio of an inner surface radius (r) of the outer nacelle to a total volume (V) of the engine controller to the cubed root;

$$r/\sqrt[3]{V}).$$

The resulting relationship can be thought of as an indicator of the ability of a turbofan engine to maintain or even improve upon a desired propulsive efficiency via inclusion of a desired fan diameter while also accounting for packaging and weight concerns for the engine controller and outer nacelle.

Figure 1:
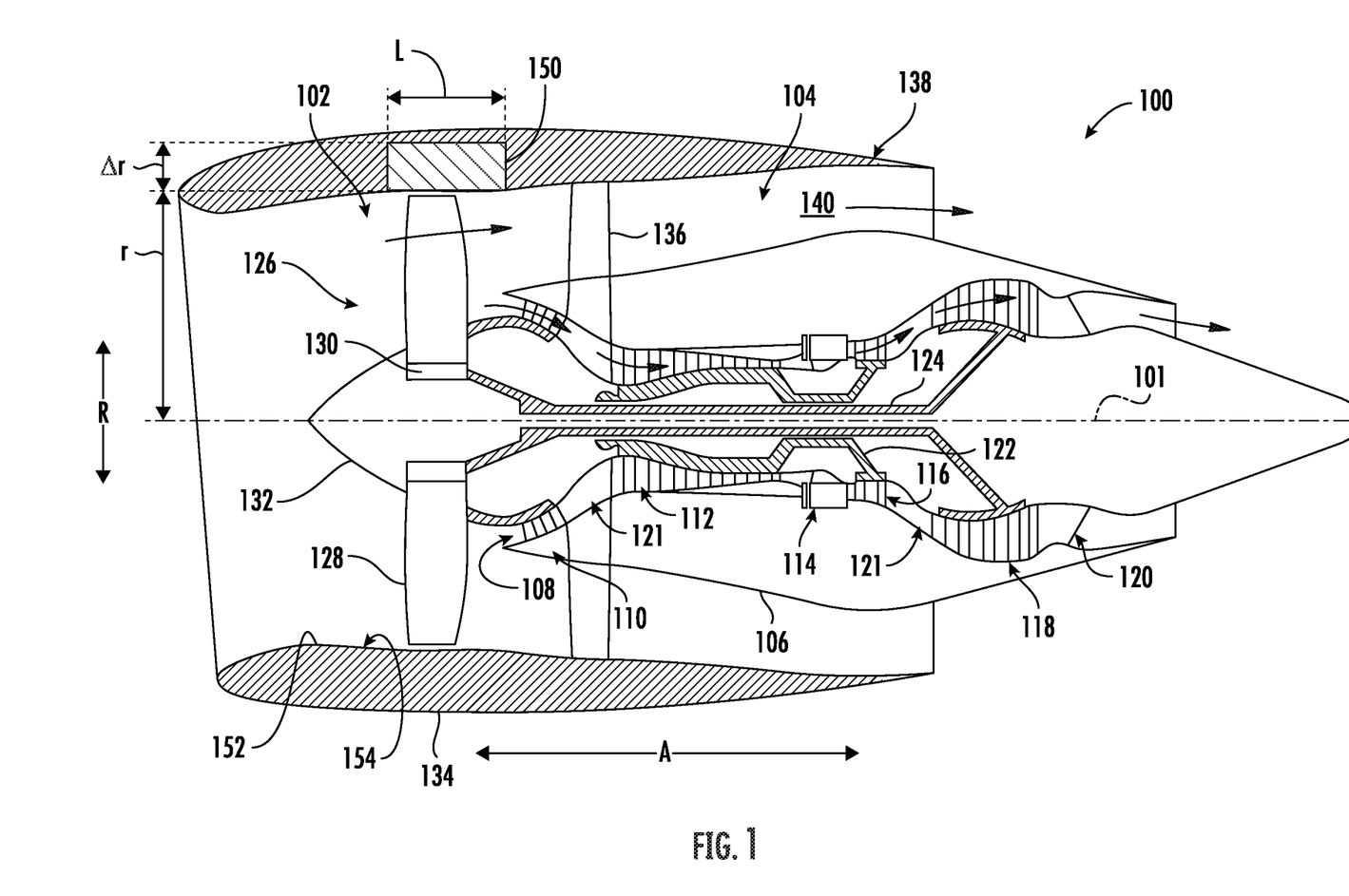
FIG. 1 is a cross-sectional view of a gas turbine engine in accordance with an exemplary aspect of the present disclosure.

Referring now to the drawings, wherein identical numerals indicate the same elements throughout the figures, FIG. 1 provides a schematic, cross-sectional view of an engine in accordance with an exemplary embodiment of the present disclosure.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet exhaust nozzle section 120. The turbofan engine further includes one or more drive shafts. More specifically, the turbofan engine 100 includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Referring still to FIG. 1, it will be appreciated that the exemplary turbofan engine 100 further includes an engine controller 150. More specifically, for the embodiment depicted, the engine controller 150 is positioned within the nacelle 134 (e.g., within a housing of the nacelle 134), and more specifically, is mounted within the nacelle 134 at a location over the plurality of fan blades 128 of the fan 126 (e.g., aligned with the plurality of fan blades 128 of the fan 126 along the axial direction A). In particular, the nacelle 134 includes an inner wall 152 defining an inner surface 154 located outward of the plurality of fan blades 128 of the fan 126, with the engine controller 150 mounted to, or otherwise positioned adjacent to, the inner wall 152.

It will be appreciated that the term "engine controller" refers to a computing assembly having at least a processor and memory configured to receive one or more inputs and provide one or more control instructions for the turbofan engine 100 (i.e., one or more control instructions to a system or component of the turbofan engine 100 or to a system affecting operation of the turbofan engine 100). The one or more inputs may be: data indicative of an engine operating condition, data indicative of a flight condition or flight mode, data indicative of control decisions from an operator, or the like. The one or more control instructions for the turbofan engine 100 may be control signals relating to: a fuel flow to the turbofan engine, operations of one or more variable geometry components, operations of one or more actuators, operations of one or more accessory systems of the turbofan engine (e.g., active clearance control, thermal management systems of the turbofan engine, de-icing or anti-icing systems of the turbofan engine, lubrication system(s) of the turbofan engine, etc.), power extraction or power addition commands for one or more electric machines, or the like, or combinations thereof.

For example, in at least certain exemplary embodiments, the engine controller 150 may be a full authority digital engine control ("FADEC") controller. However, in other embodiments, other suitable engine controllers may be provided. For example, in other embodiments, the engine controller 150 may include health monitoring units and other electronic systems.

In at least certain exemplary embodiments, an entirety of the engine controller 150 may be housed within a single structure (e.g., a single outer casing 160, discussed below with reference to FIG. 3). However, in other embodiments, the engine controller 150 may a distributed engine controller located at different positions within the turbofan engine 100. For example, in certain embodiments, the engine controller 150 may be positioned within multiple outer casings 160 spaced along a circumferential direction C (see, e.g., embodiment of FIG. 5, discussed below). In other embodiments, there may portions of the engine controller 150 located elsewhere within the outer nacelle 134 or outside of the outer nacelle 134. In such a configuration, the engine controller 150 is still considered to be positioned within the nacelle 134 as at least a portion of the engine controller 150 is positioned within the outer nacelle 134.

It will be appreciated that although the engine controller 150 is depicted mounted within the nacelle 134 at the location over the plurality of fan blades 128 of the fan 126, in at least certain exemplary embodiments the engine controller 150 may be positioned forward of the plurality of fan blades 128 of the fan 126 along the axial direction A, or may be positioned aft of the plurality of fan blades 128 of the fan 126 along the axial direction A. Generally, the engine controller 150 is mounted at a location within the outer nacelle 134 having a greatest radial extent.

As will also be appreciated from the embodiment depicted in FIG. 1, the nacelle 134 defines an inner surface radius (r) along the radial direction R inward of the engine controller 150. The inner surface radius (r) refers to a distance along the radial direction R from the centerline axis 101 to the nacelle inner surface 154, opposite the inner wall 152 where the engine controller 150 is mounted. More specifically, the inner surface radius (r) refers to a length along the radial direction R from the centerline axis 101 to the nacelle inner surface 154 at a location along the centerline axis 101 where the plurality of fan blades 128 are positioned, and more specifically, still, at a location along the centerline axis 101 where leading edges of the plurality of fan blades 128 meet respective outer tips of the plurality of fan blades 128.

Further, the engine controller 150 and nacelle inner surface 154 define a radial height ($\Delta r$) along the radial direction R. The radial height ($\Delta r$) refers to a distance along the radial direction R from the inner surface 154 to an outermost surface of the engine controller 150 along the radial direction R. The radial height ($\Delta r$) is measured in a plane perpendicular to the centerline axis 101 (a plane defined by the radial direction R for the embodiment shown; a "radial plane"). For the embodiment depicted, where the engine controller 150 is positioned over the plurality of fan blades 128, the radial height ($\Delta r$) refers to a distance along the radial direction R from the inner surface 154 to the outermost surface of the engine controller 150 along the radial direction R at a location along the centerline axis 101 where the plurality of fan blades 128 are positioned. In such a manner, the inner surface radius (r) and radial height ($\Delta r$) are each defined in the same radial plane in the embodiment of FIG. 1.

However, in other embodiments, e.g., when the engine controller 150 is positioned forward or aft of the plurality of fan blades 128, the radial height ($\Delta r$) may alternatively be defined at a different location along the centerline axis 101—a location where the outermost surface of the engine controller 150 along the radial direction R is positioned.

In the embodiment depicted, where the inner surface radius (r) and radial height ($\Delta r$) are each defined in the same radial plane, the sum of the radial height ($\Delta r$) and the inner surface radius (r) locates the radially outermost location of the engine controller 150 relative to the engine centerline axis 101 and the sum of two times the inner surface radius (r) and the radial height ($\Delta r$) (i.e., $2 \times r + \Delta r$) is the distance from the radially outermost location of the engine controller 150 to the opposite wall 152.

Figure 2:
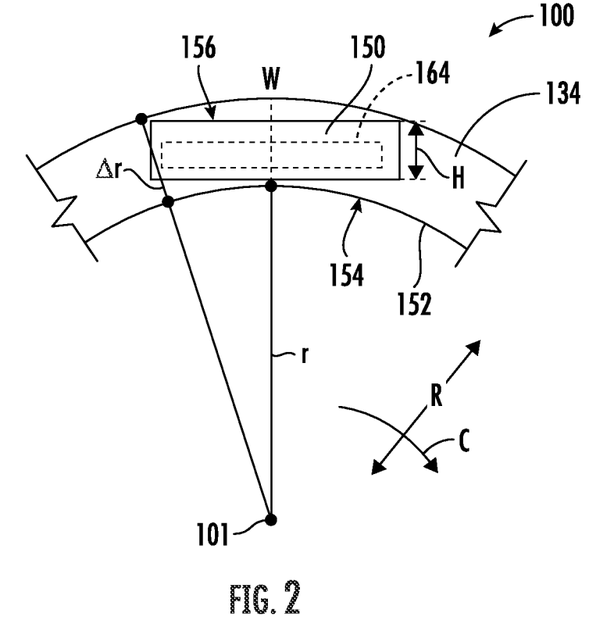
FIG. 2 is a schematic view of a portion of an outer nacelle and engine controller of the exemplary gas turbine engine of FIG. 1, as viewed along an axial direction of the gas turbine engine.

More specifically, referring now also to FIG. 2, providing a schematic view of a portion of the outer nacelle 134 and engine controller 150, as viewed along the axial direction A of the turbofan engine 100, it will be appreciated that the radial height (Δr) more specifically refers to a distance along the radial direction R from the inner surface 154 opposite the inner wall 152 where the engine controller 150 is mounted to an outermost point of the outermost surface of the engine controller 150 along the radial direction R. Although FIG. 2 depicts the inner wall 152 schematically as a single line, it will be appreciated that the radial height (Δr) incorporates a thickness of the inner wall 152 in its measurement.

Moreover, referring still also to FIG. 2, it will be appreciated that the engine controller 150 defines a length L along the axial direction A (see FIG. 1), a width W (see FIG. 2), a height H (see FIG. 2), an outer surface area SA (not shown), and a total volume V. For a box-shaped engine controller 150, such as the one depicted in FIGS. 1 and 2, the outer surface area SA refers to a surface area of a top face 156 of the engine controller 150, which may be a product of the length L and the width W of the engine controller 150. Further, for a box-shaped engine controller 150, the total volume V refers to a product of the length L, width W, and height H of the engine controller 150.

As explained in more detail elsewhere herein, the engine controller 150 is generally configured as a conformal engine controller configured to have a relatively small radial footprint, enabling, e.g., higher diameter fans 126, higher bypass ratios (i.e., ratio of airflow through the bypass airflow passage 140 to the airflow through the annular inlet 108; see FIG. 1), higher propulsive efficiencies, etc. In order to do this, one may simply conclude that the housing of the engine controller 150 should be designed for a larger outer surface area SA. But a simple increase in the surface area (or reduced profile in the radial plane) can result in an unacceptable weight increase of the engine controller 150.

Figure 3:
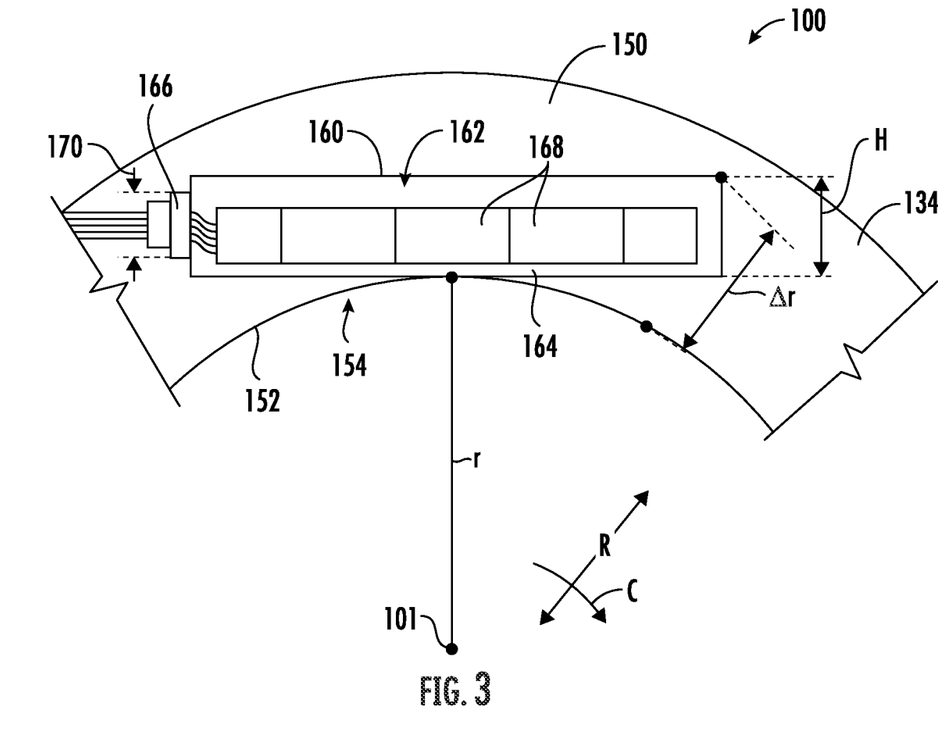
FIG. 3 is a close-up, schematic view of the outer nacelle and engine controller of the exemplary gas turbine engine of FIG. 2.

Referring now to FIG. 3, a close-up, schematic view of the exemplary engine controller 150 and nacelle 134 is provided. As will be appreciated, the exemplary engine controller 150 generally includes an outer casing 160 defining an enclosure 162, one or more circuit boards 164 positioned within the enclosure 162, and an electrical connector 166 mounted to the outer casing 160 for connecting the one or more circuit boards 164 to various aspects of the turbofan engine 100 and/or an aircraft incorporating the turbofan engine 100. Notably, the circuit board(s) 164 may include one or more components 168, such as one or more memory components, resistors, transistors, capacitors, inductors, transformers, diodes, sensors, etc.

For the embodiment shown, the electrical connector 166 is positioned at an end of the engine controller 150 along the circumferential direction C. It will be appreciated that the electrical connector 166 defines a height 170. The height 170 of the electrical connector 166 may be at least 50% of the height H of the engine controller 150, such as at least 70%, such as at least 80%, such as at least 90%, such as up to 120%. In such a manner, it will be appreciated that the height 170 of the electrical connector 166 may affect the height H of the engine controller 150, and therefore the radial height of the outer nacelle 134.

It will be appreciated that although the electrical connector 166 of the engine controller 150 is positioned at an end of the engine controller 150 along the circumferential direction C, in other embodiments, the electrical connector 166 may alternatively be positioned at an end of the engine controller 150 along the axial direction A. Alternately, still, the engine controller 150 may include a plurality of electrical connectors 166 at various locations.

It will be appreciated that although for the embodiment of FIGS. 2 and 3, the engine controller 150 is designed as having a relatively box shape (e.g., rectangular/shared sides perpendicular all adjacent sides), in other embodiments of the present disclosure, the engine controller 150 may have any other suitable design capable of achieving a desired reduced radial footprint.

Figure 4:
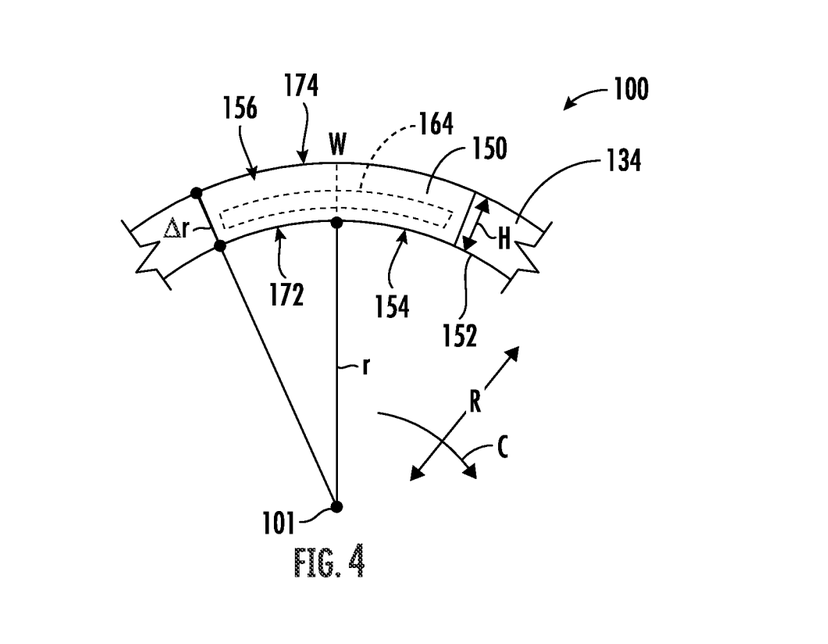
FIG. 4 is a schematic view of a portion of an outer nacelle and engine controller of a gas turbine engine in accordance with another exemplary embodiment of the present disclosure.

For example, referring now to FIG. 4, a schematic view of a portion of an outer nacelle 134 and an engine controller 150 in accordance with another exemplary embodiment of the present disclosure, as viewed along an axial direction A of a turbofan engine 100, is provided. The exemplary outer nacelle 134 and engine controller 150 may generally be configured in a similar manner as the exemplary outer nacelle 134 and engine controller 150 described above with reference to FIGS. 1 through 3.

However, for the embodiment depicted, the engine controller 150 generally defines a curved profile. More specifically, it will be appreciated that the turbofan engine 100 generally defines a reference plane perpendicular to the axial direction A (i.e., the plane viewed in FIG. 4). A casing of the engine controller 150 (not labeled in FIG. 4; see outer casing 160 of the engine controller 150 of FIG. 3) defines the curved profile in the reference plane. More specifically, the casing of the engine controller 150 defines an inner curved profile 172 and an outer curved profile 174. The inner curved profile 172 may define a radius of curvature in the reference plane within 50% of an inner surface radius (r) of the nacelle 134. For example, in certain exemplary embodiments, the inner curved profile 172 may define a radius of curvature in the reference plane within 25% of the inner surface radius (r), such as within 10% of the inner surface radius (r). Further, in at least certain exemplary aspects, the outer curved profile 174 may define a radius of curvature in the reference plane within 20% of the radius of curvature of the inner curved profile 172.

Notably, as is depicted in phantom in FIG. 4, the exemplary engine controller 150 further includes one or more circuit boards 164. For the embodiment depicted, the one or more circuit boards 164 define a curved profile in the reference plane perpendicular to the axial direction A. This may allow for the one or more circuit boards 164 of a desired size to more compactly fit within the engine controller 150 having the curved profile. The curved profile of the circuit board(s) 164 may have a radius of curvature within the ranges set forth above for the inner and outer curved profiles 172, 174.

Further, it will be appreciated that in still other exemplary embodiments, an engine controller 150 in accordance with an exemplary embodiment of the present disclosure may have still other suitable configurations. For example, referring now to FIG. 5, a schematic view of a portion of an outer nacelle 134 and an engine controller 150 in accordance with another exemplary embodiment of the present disclosure, as viewed along an axial direction A of a turbofan engine 100, is provided. The exemplary outer nacelle 134 and engine controller 150 may generally be configured in a similar manner as the exemplary outer nacelle 134 and engine controller 150 described above with reference to FIGS. 1 through 4.

Figure 5:
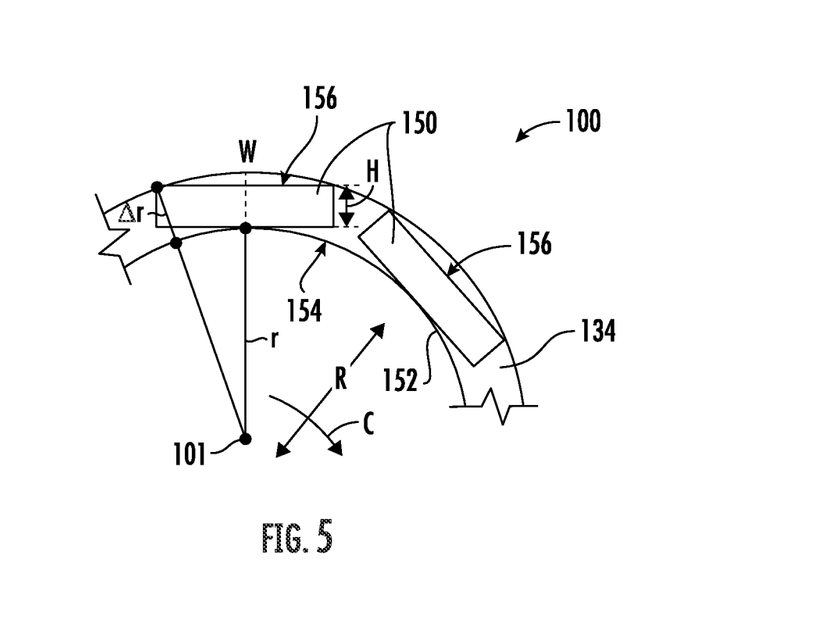
FIG. 5 is a schematic view of a portion of an outer nacelle and engine controller of a gas turbine engine in accordance with yet another exemplary embodiment of the present disclosure.

However, for the embodiment depicted, the engine controller 150 is not configured as a single discrete box, and instead includes a plurality of discrete boxes spaced along a circumferential direction C of the turbofan engine 100. In particular, for the embodiment depicted, the engine controller 150 includes two discrete boxes spaced along the circumferential direction C. However, in other exemplary embodiments, the engine controller 150 may include any other suitable number of discrete boxes (e.g., between 2 and 10). The plurality discrete boxes may be spaced along the circumferential direction C, along the axial direction A (see FIG. 1), or both.

In such an exemplary embodiment, it will be appreciated that a total volume V of the engine controller 150 refers to a sum of the total volume V of each of the plurality of discrete boxes of the engine controller 150. Similarly, an outer surface area SA of the engine controller 150 refers to a sum of an outer surface area SA of a top face 156 of each of the plurality of discrete boxes.

In still other exemplary embodiments, the engine controller 150 may have still other configurations. For example, in other exemplary embodiments, the engine controller 150 may have a faceted profile. More specifically, the engine controller 150 may include an effectively curved profile (similar to the embodiment of FIG. 5), but with multiple flat faces along the circumferential direction C, so the internal circuit boards 164 could be flat. This would approximate the curved design in FIG. 5, but still using flat circuit boards 164. Such a configuration may also save on weight from cabling as compared to a multiple box design, such as the embodiment of FIG. 5. For example, in certain exemplary embodiments, the engine controller 150 may include between two and 20 flat faces arranged along the circumferential direction C (which may look like between two and 20 flat box-shaped controller boxes welded or otherwise joined together to have a common internal volume).

Figure 6:
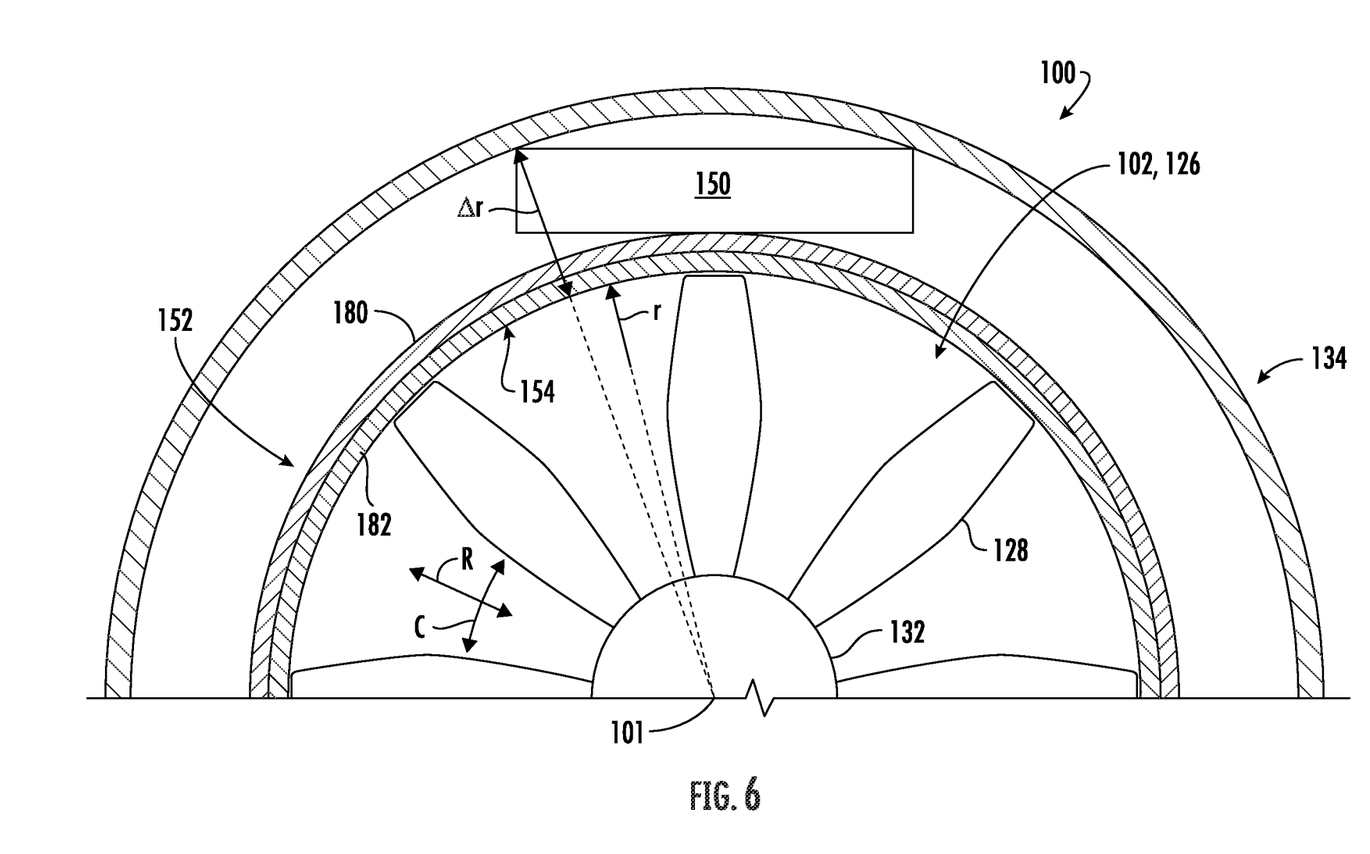
FIG. 6 is a schematic, cross-sectional view of a portion of an outer nacelle and engine controller of a gas turbine engine in accordance with an exemplary aspect of the present disclosure.

Further, in other embodiments, the turbofan engine 100 may be configured in any other suitable manner. For example, referring now to FIG. 6, a close-up, cross-sectional, schematic view is provided of a turbofan engine 100 in accordance with an aspect of the present disclosure. As will be appreciated, the turbofan engine 100 includes an outer nacelle 134 and an engine controller 150. The outer nacelle 134 includes an inner wall 152 defining an inner surface 154. The inner wall 152 in the embodiment shown includes more than one layer. In particular, the inner wall 152 includes a base layer 180 and a supplemental layer 182. In one embodiment, the base layer 180 may be a structural layer and the supplemental layer 182 may be an acoustic dampening layer. Additionally or alternatively, the supplemental layer 182 may be a shielding layer (e.g., to protect against a potential fan blade 128 release), a clearance control layer (e.g., configured to manage a clearance between the inner surface 154 and tips of the fan blades 128), etc. The base layer 180, the supplemental layer 182, or both may be either continuous along the circumferential direction C or segmented along the circumferential direction C. In such a manner, it will be appreciated that the term "inner wall" of the outer nacelle 134 is a broad term intended to capture any structure outward of the fan blades 128 at an inner portion of the outer nacelle 134 along a radial direction R.

As alluded to earlier, the inventors discovered, unexpectedly during the course of turbofan engine design—i.e., evaluating different turbofan engines, each with various differences in fan characteristics (e.g., fan diameter) resulting in nacelle weight and height impacts, and associated modifications to engine controller weights and packaging—a relationship exists between a ratio of a radial extent of the engine controller to the fan diameter (Δr/r) and a normalized engine controller radius (a ratio of the inner surface radius (r) to the total volume (V) of the engine controller to cubed root). The resulting relative controller height and normalized controller radius relationship can be thought of as an indicator of the ability of a turbofan engine to maintain or even improve upon a desired propulsive efficiency via inclusion of a desired fan diameter while maintaining packaging concerns and weight concerns for the engine controller and outer nacelle.

As will be appreciated, it may generally be desirable to increase a diameter of a fan of a ducted turbofan engine to increase an overall propulsive efficiency of the gas turbine engine. However, with larger fan diameters, the ducted turbofan engine may also require a larger outer nacelle, which may lead to packaging concerns, weight and loading concerns, etc. The inventors of the present disclosure found that the outer nacelle for an engine including a higher diameter fan may be advantageously reduced in size by an amount determined from an optimally sized engine controller to achieve the purpose of reducing the nacelle height (i.e., an engine controller having a minimal radial height without unacceptable weight and packaging concerns for the nacelle).

The most volume-efficient design for the engine controller is a cube-shape, which maximizes an internal volume and minimizes an amount of material needed for the casing of the engine controller, reducing an overall weight of the engine controller. However, the inventors of the present disclosure have found that such may lead to a radial extent prohibitively large for facilitating the relatively low radial thickness outer nacelles that may be desirable for an engine including a fan having a larger fan diameter. Instead, the inventors have found that an engine controller having a smaller radial extent, within a range defined herein, may facilitate the relatively low radial thickness nacelles described above without creating an unnecessarily thin and heavy engine controller. Thus, as mentioned above, there is a trade-off between a desire to reduce the radial height and avoiding excessive weight gain.

Utilizing this relationship, the inventors found that the number of suitable or feasible turbofan engine designs incorporating a fan having a relatively large fan diameter and engine controller having a desired size, capable of meeting both the propulsive efficiency requirements and packaging and weight concerns for the engine controller, could be greatly diminished. The discovered relationship, therefore, not only may define an optimal controller design, but can also facilitate a more rapid down selection of designs to consider as a turbofan engine is being developed. Such a benefit provides more insight to the requirements for a given turbofan engine well before specific technologies, integration and system requirements are developed fully. It avoids late-stage redesign. The desired relationship is represented by the following Equation (1):

$$0.1(r')^{-1} < \frac{\Delta r}{r} < K(r')^{-4/3}; \quad \text{Equation (1)}$$

where r' is a normalized radius of an engine controller, Or is a radial height of the engine controller, r is an inner surface radius of an outer nacelle along a radial direction of the engine inward of the engine controller, and K is a correlation constant.

Notably, the normalized radius (r') is a ratio of the inner surface radius (r) to a total volume of the engine controller (V) to cubed root (i.e., $$r/\sqrt[3]{V}).$$

The normalized radius (r') scales the radius relative to a side of a characteristic single, cubical box having the same total volume as the engine controller, which can be non-cubic in shape. In such a manner, the normalized radius (r') reflects a baseline for what the radial extent of the engine controller would be if a volume-efficient design was the driving factor in the engine controller design. Further, K, as noted above is a correlation constant. The correlation constant, K, reflects an upper boundary where it is believed the benefits of Equation (1) remain valid. Notably, along with the radial height ($\Delta r$) and total volume (V), a total surface area (A) of a top surface of the engine controller may also be an indicator of the engine controller's design, and may further have an influence on, e.g., an ability of the engine controller to reject heat during operation of the engine.

TABLE 1 provides ranges of the variables over which Equation (1) is defined and believed to provide the noted benefits discussed earlier

TABLE 1

| Symbol | Description | Ranges appropriate for using Eq. (1) |
|---|---|---|
| r | Inner surface radius | 17 inches (in) to 84, such as 35 in to 44 in |
| V | Total volume of the engine controller | 500 in$^3$ to 3000 in$^3$, such as 900 in$^3$ to 1500 in$^3$ |
| r' | Normalized radius | 1.25 to 8, such as 2.75 to 4.5 |
| $\Delta r$ | Radial height of the engine controller | 0.5 in to 8 in, such as 1 in to 4 in |
| A | Total surface area of a top surface of the engine controller | 254 in$^2$ to 2043 in$^2$, such as 305 in$^2$ to 2035 in$^2$ |
| K | Correlation parameter | 40% or 65% |

Figure 7A:
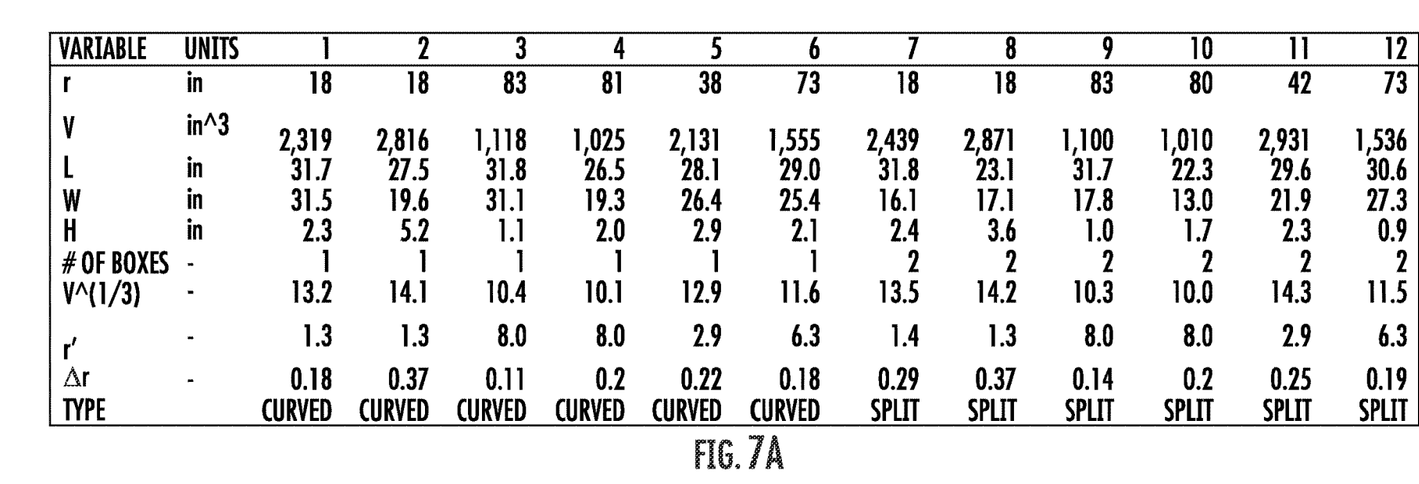
FIGS. 7A and 7B are tables including numerical values corresponding to several gas turbine engines in accordance with exemplary aspects of the present disclosure.
Figure 7B:
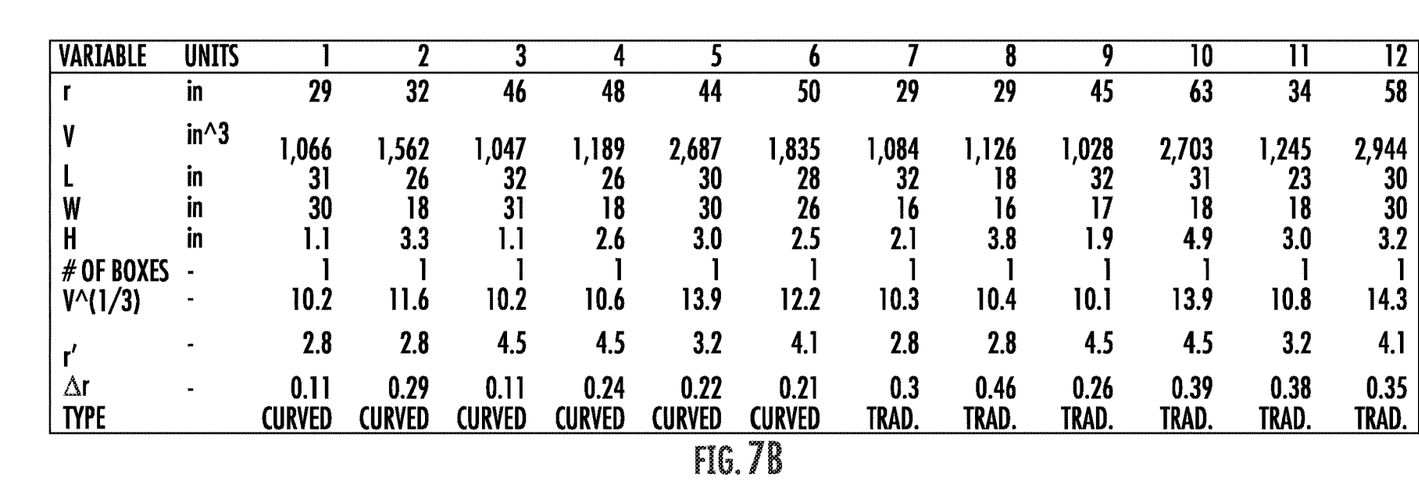
Figure 8:
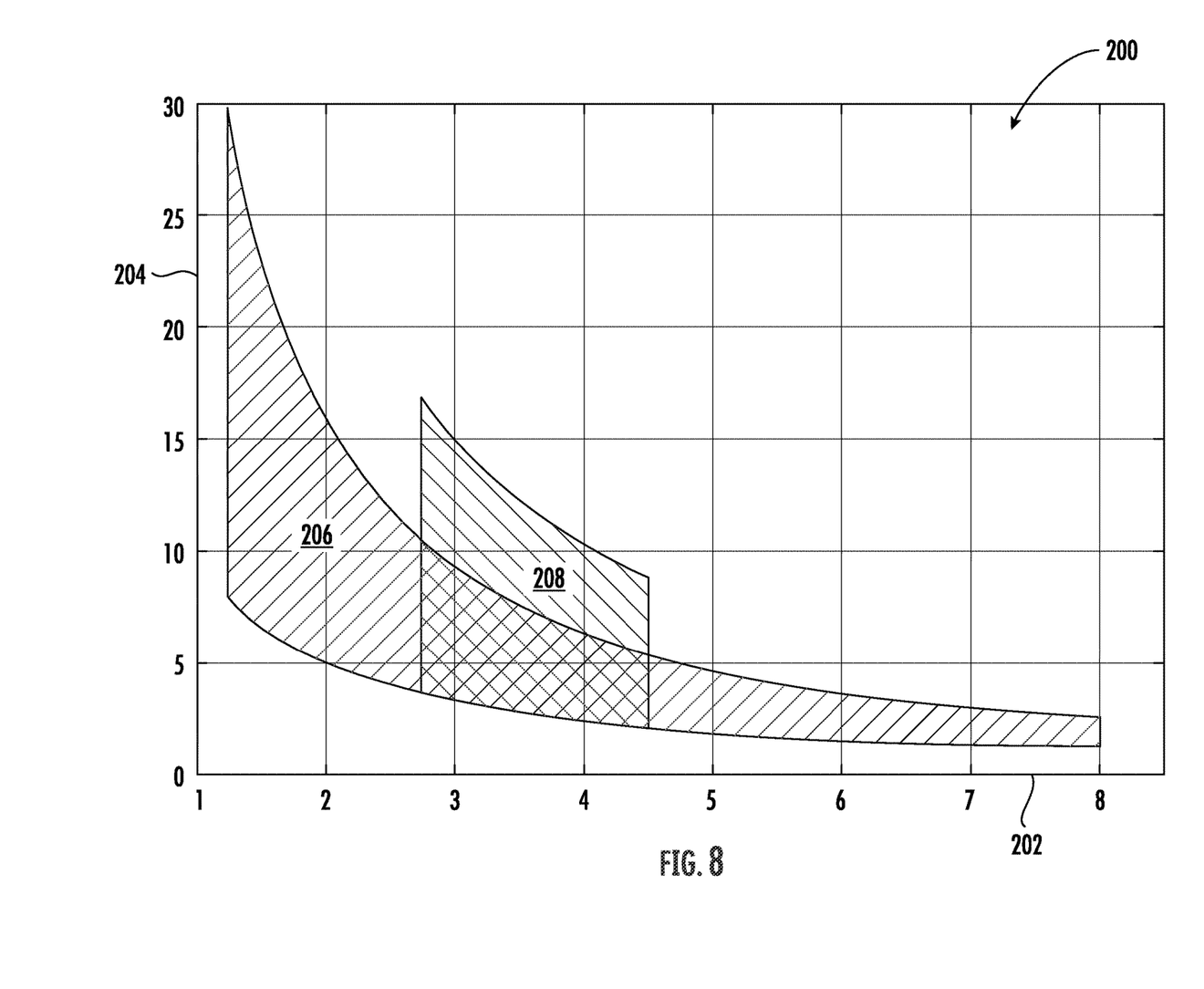
FIG. 8 is a plot of gas turbine engines in accordance with one or more exemplary embodiments of the present disclosure.

Referring now to FIGS. 7A, 7B, and 8, data of exemplary gas turbine engines are provided in accordance with one or more exemplary embodiments of the present disclosure. In particular, FIGS. 7A and 7B provide tables including numerical values corresponding to the shaded areas indicated in the graph of FIG. 8. In particular, FIG. 7A provides a table including numerical values corresponding to a first area 206 in FIG. 8. FIG. 7B provides a table including numerical values corresponding to a second area 208 in FIG. 8. In the tables of FIGS. 7A and 7B, "# of boxes" refers to the number of separate enclosures for the engine controller (see, e.g., FIGS. 2 and 4 for single enclosure embodiments and FIG. 5 for a two enclosure embodiment); and "TYPE" refers to whether the engine controller has a boxed-shape design ("TRAD."; see FIG. 2), or if the engine controller has a curved profile ("CURVED"; see FIG. 4), or if the engine controller has multiple enclosures ("SPLIT"; see FIG. 5).

FIG. 8 is a plot 200 of gas turbine engines in accordance with one or more exemplary embodiments of the present disclosure, showing the relationships between the normalized radius of the engine controller on an x-axis 202 and a ratio of the engine controller radial height to inner surface radius on a y-axis 204. The first area 206 on the plot reflects a first range wherein the normalized radius (r') is between 1.25 and 8 and K is equal to 40%. The second area 208 on the plot reflects a second range where the normalized radius (r') is between 2.75 and 4.5 and K is equal to 65%.

In such a manner, it will be appreciated that the first range may generally capture turbofan engines having a relatively broad range of fan diameter and including a conformal engine controller in accordance with an exemplary aspect of the present disclosure. It will further be appreciated that the second range may generally capture a more tailored range of fan diameters generally associated with narrow body aircraft (e.g., having a fan diameter between 70 and 88). As will be appreciated, due to a size of narrow body aircraft, it may generally be more difficult to obtain a conformal engine controller in these engines.

Further aspects are provided by the subject matter of the following clauses:

A gas turbine engine defining an axial direction and a radial direction and comprising: a turbomachine having a compressor section, a combustion section, and a turbine section in serial flow order; a fan section comprising a fan rotatable by the turbomachine; a nacelle enclosing the fan; and an engine controller positioned within the nacelle, wherein the nacelle defines an inner surface radius (r) along the radial direction inward of the engine controller, wherein the engine controller defines a radial height ($\Delta r$) along the radial direction, a total volume (V), and a normalized radius (r'), wherein the normalized radius (r') is a ratio of the inner surface radius (r) to the total volume (V) to cube root, and wherein these parameters are related by the following equation:

$$0.1(r')^{-1} < \frac{\Delta r}{r} < K(r')^{-4/3},$$

wherein the normalized radius (r') is between 1.25 and 8 and K is equal to 40%, or the normalized radius (r') is between 2.75 and 4.5 and K is equal to 65%.

The gas turbine engine of one or more of these clauses, wherein the normalized radius (r') is between 1.25 and 8 and K is equal to 40%.

The gas turbine engine of one or more of these clauses, wherein the normalized radius (r') is between 2.75 and 4.5 and K is equal to 65%.

The gas turbine engine of one or more of these clauses, wherein the engine controller comprises a top face defining a surface area, wherein the surface area is greater than or equal to 254 square inches and less than or equal to 2043 square inches.

The gas turbine engine of one or more of these clauses, wherein the inner surface radius (r) is greater than or equal to 17 inches and less than or equal to 84 inches.

The gas turbine engine of one or more of these clauses, wherein the inner surface radius (r) is greater than or equal to 35 inches and less than or equal to 44 inches.

The gas turbine engine of one or more of these clauses, wherein the total volume (V) is greater than or equal to 500 inches cubed and less than or equal to 3000 inches cubed.

The gas turbine engine of one or more of these clauses, wherein the total volume (V) is greater than or equal to 900 inches cubed and less than or equal to 1500 inches cubed.

The gas turbine engine of one or more of these clauses, wherein the radial height ($\Delta r$) is greater than or equal to 0.5 inches and less than or equal to 8 inches.

The gas turbine engine of one or more of these clauses, wherein the radial height ($\Delta r$) is greater than or equal to 1 inch and less than or equal to 4 inches.

The gas turbine engine of one or more of these clauses, wherein the engine controller comprises a casing defining a curved profile in a reference plane perpendicular to the axial direction.

The gas turbine engine of one or more of these clauses, wherein the engine controller comprises one or more circuit boards, and wherein the one or more circuit boards define a curved profile in the reference plane perpendicular to the axial direction.

The gas turbine engine of one or more of these clauses, wherein the engine controller comprises a plurality of discrete boxes spaced along a circumferential direction of the gas turbine engine, along the axial direction of the gas turbine engine, or both.

The gas turbine engine of one or more of these clauses, wherein the outer nacelle comprises an inner wall defining an inner surface, wherein the inner surface radius (r) is defined by the inner surface, and wherein the inner wall comprises a base layer and a supplemental layer.

The gas turbine engine of one or more of these clauses, wherein the engine controller comprises a computing assembly having at least a processor and memory.

The gas turbine engine of one or more of these clauses, wherein the engine controller is configured to receive one or more inputs and provide one or more control instructions for the gas turbine engine.

The gas turbine engine of one or more of these clauses, wherein the one or more inputs comprise data indicative of an engine operating condition, data indicative of a flight condition or a flight mode, data indicative of a control decision from an operator, or a combination thereof.

The gas turbine engine of one or more of these clauses, wherein the one or more control instructions for the gas turbine engine comprise one or more control signals relating to: a fuel flow to the gas turbine engine, operation of one or more variable geometry components, operation of one or more actuators, operation of one or more accessory systems of the gas turbine engine, power extraction or power addition commands for one or more electric machines, or a combination thereof.

The gas turbine engine of one or more of these clauses, wherein the one or more accessory system comprises an active clearance control, a thermal management system, a de-icing system, an anti-icing system, a lubrication system, or a combination thereof.

The gas turbine engine of one or more of these clauses, wherein the one or more control instructions for the gas turbine engine comprise one or more control signals relating to: a fuel flow to the gas turbine engine, operation of one or more variable geometry components, or a combination thereof.

The gas turbine engine of one or more of these clauses, wherein the engine controller comprises a casing housing the processor and memory.

The gas turbine engine of one or more of these clauses, wherein the engine controller comprises a full authority digital engine control controller.

An engine controller for a gas turbine engine defining an axial direction and a radial direction, the gas turbine engine having a nacelle enclosing a fan, wherein the nacelle defines an inner surface radius (r) along the radial direction inward of the engine controller, the engine controller comprising: a casing defining an enclosure, the enclosure having a total volume (V), wherein the engine controller defines a radial height (Δr) along the radial direction when installed in the gas turbine engine and a normalized radius (r') when installed in the gas turbine engine, wherein the normalized radius (r') is a ratio of the inner surface radius (r) to the total volume (V) to cube root, and wherein these parameters are related by the following equation:

$$0.1(r')^{-1} < \frac{\Delta r}{r} < K(r')^{-4/3},$$

wherein the normalized radius (r') is between 1.25 and 8 and K is equal to 40%, or the normalized radius (r') is between 2.75 and 4.5 and K is equal to 65%.

The engine controller of one or more of these clauses, wherein the normalized radius (r') is between 1.25 and 8 and K is equal to 40%.

The engine controller of one or more of these clauses, wherein the normalized radius (r') is between 2.75 and 4.5 and K is equal to 65%.

The engine controller of one or more of these clauses, wherein the engine controller comprises a top face defining a surface area, wherein the surface area is greater than or equal to 254 square inches and less than or equal to 2043 square inches.

The engine controller of one or more of these clauses, wherein the total volume (V) is greater than or equal to 500 inches cubed and less than or equal to 3000 inches cubed.

The engine controller of one or more of these clauses, wherein the radial height (Δr) is greater than or equal to 0.5 inches and less than or equal to 8 inches.

The engine controller of one or more of these clauses, wherein the casing defines a curved profile in a reference plane perpendicular to the axial direction when installed in the gas turbine engine.

The engine controller of one or more of these clauses, further comprising a processor and memory positioned within the casing.

The engine controller of one or more of these clauses, wherein the engine controller is configured to receive one or more inputs and provide one or more control instructions for the gas turbine engine.

The engine controller of one or more of these clauses, wherein the one or more inputs comprise data indicative of an engine operating condition, data indicative of a flight condition or a flight mode, data indicative of a control decision from an operator, or a combination thereof.

The engine controller of one or more of these clauses, wherein the one or more control instructions for the gas turbine engine comprise one or more control signals relating to: a fuel flow to the gas turbine engine, operation of one or more variable geometry components, operation of one or more actuators, operation of one or more accessory systems of the gas turbine engine, power extraction or power addition commands for one or more electric machines, or a combination thereof.

The engine controller of one or more of these clauses, wherein the one or more accessory system comprises an active clearance control, a thermal management system, a de-icing system, an anti-icing system, a lubrication system, or a combination thereof.

The engine controller of one or more of these clauses, wherein the engine controller comprises a full authority digital engine control controller.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining an axial direction and a radial direction and comprising:
   a turbomachine having a compressor section, a combustion section, and a turbine section in serial flow order;
   a fan section comprising a fan rotatable by the turbomachine;
   a nacelle enclosing the fan and defining at least in part a bypass passage with the turbomachine; and
   an engine controller positioned within the nacelle, wherein the nacelle defines an inner surface radius (r) along the radial direction inward of the engine controller, wherein the engine controller defines a radial height (Δr) along the radial direction, a total volume (V), and a normalized radius (r'), wherein the normalized radius (r') is a ratio of the inner surface radius (r) to the total volume (V) to cube root, and wherein these parameters are related by the following equation:

$$0.1(r')^{-1} < \frac{\Delta r}{r} < K(r')^{-4/3},$$

wherein the normalized radius (r') is between 1.25 and 8 and K is equal to 40%, or the normalized radius (r') is between 2.75 and 4.5 and K is equal to 65%.

2. The gas turbine engine of claim 1, wherein the normalized radius (r') is between 1.25 and 8 and K is equal to 40%, wherein the engine controller comprises a top face defining a surface area, wherein the surface area is greater than or equal to 254 square inches and less than or equal to 2043 square inches, and wherein the inner surface radius (r) is greater than or equal to 17 inches and less than or equal to 84 inches, wherein the total volume (V) is greater than or equal to 500 inches cubed and less than or equal to 3000 inches cubed, wherein the radial height (Δr) is greater than or equal to 0.5 inches and less than or equal to 8 inches.

3. The gas turbine engine of claim 1, wherein the engine controller comprises a computing assembly having at least a processor and memory.

4. The gas turbine engine of claim 3, wherein the engine controller is configured to receive one or more inputs and provide one or more control instructions for the gas turbine engine.

5. The gas turbine engine of claim 4, wherein the one or more inputs comprise data indicative of an engine operating condition, data indicative of a flight condition or a flight mode, data indicative of a control decision from an operator, or a combination thereof.

6. The gas turbine engine of claim 4, wherein the one or more control instructions for the gas turbine engine comprise one or more control signals relating to: a fuel flow to the gas turbine engine, operation of one or more variable geometry components, operation of one or more actuators, operation of one or more accessory systems of the gas turbine engine, power extraction or power addition commands for one or more electric machines, or a combination thereof.

7. The gas turbine engine of claim 6, wherein the one or more accessory systems comprises an active clearance control, a thermal management system, a de-icing system, an anti-icing system, a lubrication system, or a combination thereof.

8. The gas turbine engine of claim 4, wherein the one or more control instructions for the gas turbine engine comprise one or more control signals relating to: a fuel flow to the gas turbine engine, operation of one or more variable geometry components, or a combination thereof.

9. The gas turbine engine of claim 3, wherein the engine controller comprises a casing housing the processor and memory.

10. The gas turbine engine of claim 1, wherein the engine controller comprises a full authority digital engine control controller.

11. The gas turbine engine of claim 1, wherein the engine controller comprises a casing defining a curved profile in a reference plane perpendicular to the axial direction, wherein the engine controller comprises one or more circuit boards, and wherein the one or more circuit boards define a curved profile in the reference plane perpendicular to the axial direction.

12. The gas turbine engine of claim 1, wherein the engine controller comprises a plurality of discrete boxes spaced along a circumferential direction of the gas turbine engine, along the axial direction of the gas turbine engine, or both.

13. The gas turbine engine of claim 1, wherein the outer nacelle comprises an inner wall defining an inner surface, wherein the inner surface radius (r) is defined by the inner surface, and wherein the inner wall comprises a base layer and a supplemental layer.

14. An engine controller for a gas turbine engine comprising a turbomachine and defining an axial direction and a radial direction, the gas turbine engine having a nacelle enclosing a fan and defining at least in part a bypass passage with the turbomachine, wherein the nacelle defines an inner surface radius (r) along the radial direction inward of the engine controller, the engine controller comprising:
   a casing defining an enclosure, the enclosure having a total volume (V), wherein the engine controller defines a radial height (Δr) along the radial direction when installed in the gas turbine engine and a normalized radius (r') when installed in the gas turbine engine, wherein the normalized radius (r') is a ratio of the inner surface radius (r) to the total volume (V) to cube root, and wherein these parameters are related by the following equation:

$$0.1(r')^{-1} < \frac{\Delta r}{r} < K(r')^{-4/3},$$

wherein the normalized radius (r') is between 1.25 and 8 and K is equal to 40%, or the normalized radius (r') is between 2.75 and 4.5 and K is equal to 65%.

15. The engine controller of claim 14, further comprising a processor and memory positioned within the casing.

16. The engine controller of claim 15, wherein the engine controller is configured to receive one or more inputs and provide one or more control instructions for the gas turbine engine.

17. The engine controller of claim 16, wherein the one or more inputs comprise data indicative of an engine operating condition, data indicative of a flight condition or a flight mode, data indicative of a control decision from an operator, or a combination thereof.

18. The engine controller of claim 16, wherein the one or more control instructions for the gas turbine engine comprise one or more control signals relating to: a fuel flow to the gas turbine engine, operation of one or more variable geometry components, operation of one or more actuators, operation of one or more accessory systems of the gas turbine engine, power extraction or power addition commands for one or more electric machines, or a combination thereof.

19. The engine controller of claim 18, wherein the one or more accessory system comprises an active clearance control, a thermal management system, a de-icing system, an anti-icing system, a lubrication system, or a combination thereof.

20. The engine controller of claim 15, wherein the engine controller comprises a full authority digital engine control controller.

* * * * *